United States Patent Office 3,377,023
Patented Apr. 9, 1968

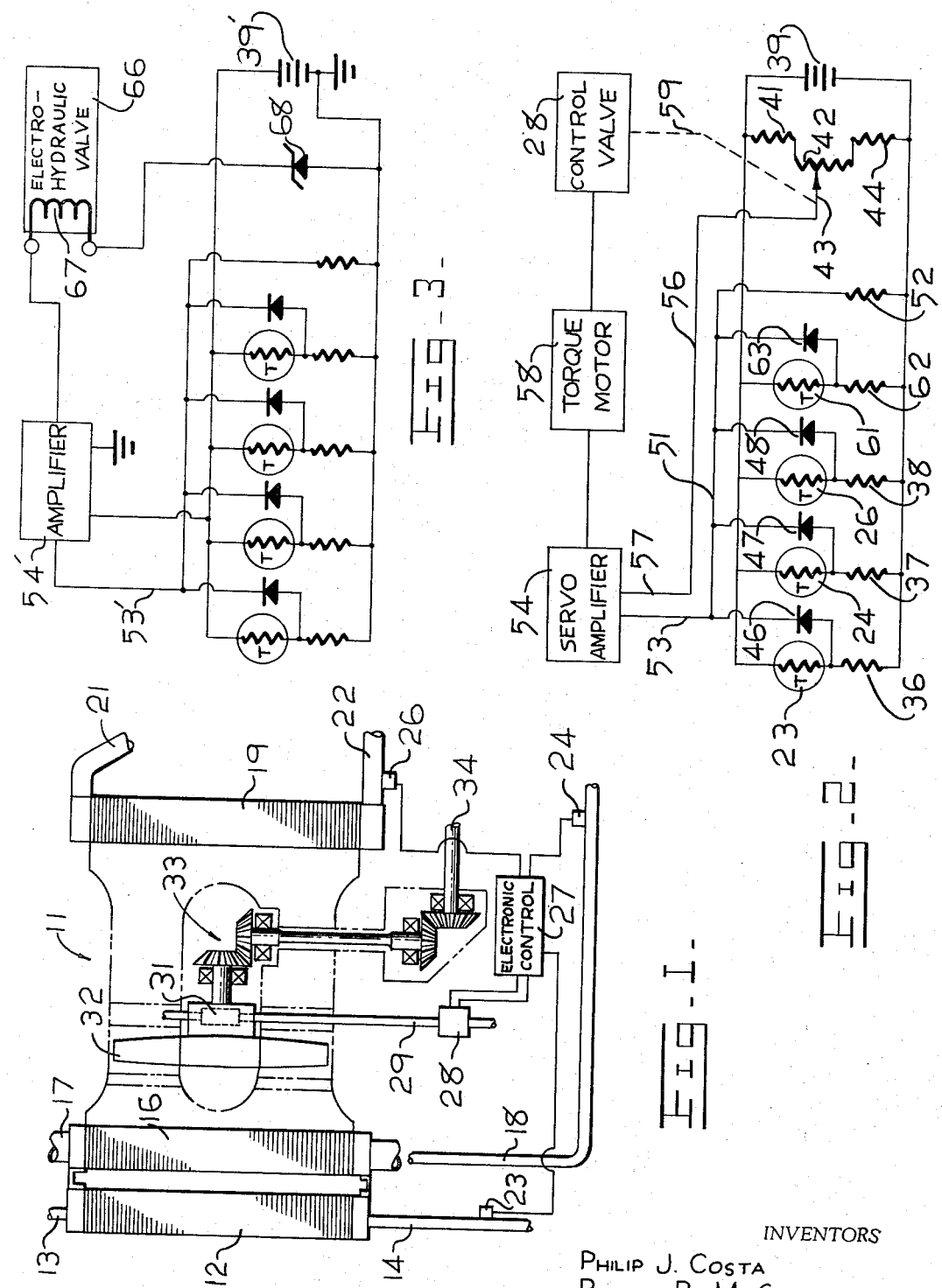

3,377,023
DISCRIMINATING VARIABLE SPEED CONTROL FOR MULTIPLE HEAT EXCHANGER FAN MOTORS
Philip J. Costa, Chillicothe, and Robert R. McCutchen, East Peoria, Ill., assignors to Caterpillar Tractor Co., Peoria, Ill., a corporation of California
Filed Feb. 1, 1966, Ser. No. 524,226
5 Claims. (Cl. 236—35)

ABSTRACT OF THE DISCLOSURE

In cooling systems wherein a single, variable speed fan provides cooling air for a plurality of heat exchangers, whose cooling air requirement may vary independently of one another, an electronic control system employing separate temperature sensitive elements associated with each heat exchanger and circuit means connecting the temperature sensitive elements together, which circuit means discriminates between the temperature sensitive elements so that the one registering the highest temperature abnormality in its associated heat exchanger, controls the speed of the fan proportionally to the cooling air needs of that heat exchanger.

---

The present invention relates to controls for operating a fan associated with a heat exchanger, and more particularly to a system for controlling the speed of a single fan associated with a heat exchanger having multiple circuits for cooling different fluids and gases.

The present invention is designed ultimately to reduce the power taken from a vehicle engine in driving a high capacity fan for cooling multiple air-cooled heat exchangers. Conventional heat exchanger cooling arrangements for internal combustion engines utilize a fan driven directly by the engine at a speed proportional to the engine speed, which often results in much wasted power and poor cooling efficiency. In order to overcome these problems, some automobile manufacturers in recent years have used cooling systems wherein the speed of the fan is variable based on the demand from a single heat exchanger. In order to assure safe operations of a multiple system where the fan is controlled in response to the temperature of a single heat exchanger, the other exchangers must be over-designed to be adequate at something less than maximum fan speed.

In order to provide an optimum system, the present invention teaches a control for a multiple heat exchanger system wherein that heat exchanger having the greatest cooling requirements controls the speed of the fan. When one particular heat exchanger is operating in or closest to its critical range and then one of the other exchangers has greater requirements, the control of the fan is automatically transferred to that heat exchanger, thereby assuring that the fan is always operating at a speed sufficient for the needs of all of the heat exchangers. As an example, it may be desirable to have a fan stopped if temperatures are below 140° F. for inlet air, below 160° F. for water, below 180° F. for one oil, and below 220° F. for a different oil, but at full fan speed if the temperature of inlet air rises above 160° F., or above 180° F. for water, above 220° F. for one oil and 250° F. for the other oil. Between these temperature ranges cooling fan speed should ideally be proportional to the temperature of the most critical cooling fluid.

The solution to the problem posed above is mechanically simple if only one temperature controls the speed of the fan; however, when several temperatures are to be monitored the complication in linkages, the possibility of one temperature affecting another and the required recalibration each time additional temperature elements are added to, or removed from the system, make the solution extremely complex and almost impossible to achieve in a practical system.

The present invention teaches a unique system wherein semiconductor diodes are used for switching into the fan speed control the one temperature element which is closest to the critical temperature range for a particular fluid being monitored. The use of the diode in each temperature sensing circuit allows any number of temperature elements to be added to or removed from the system without affecting the fan speed vs. temperature correlation of the remaining elements in the system.

Accordingly, it is an object of the present invention to provide a system for controlling the speed of a fan in a multiple heat exchanger system wherein the temperature of each of the fluids being serviced by the system is capable of controlling the speed of the fan.

A further object of the present invention is to provide a control system for a fan operating in conjunction with a multiple heat exchanger system wherein the temperature of the fluid closest to its critical range controls the speed of the fan and all of the fluids being serviced by the heat exchanger are capable of controlling the speed of the fan if any one of them should be the closest to its particular critical range.

Further objects of the present invention include providing a control for the fan of a multiple heat exchanger system wherein; fan speed is regulated by temperature to operate at any point between zero r.p.m. and the maximum rated r.p.m. to minimize the power required from the engine for operating the fan; regardless of the number of temperatures being monitored, only one temperature element is in the control position at a given time; the transfer of control to the highest temperature is instantaneous and automatic; any number of temperature sensing elements may be used in the system without affecting the fan speed control for each element; the temperature range for each element may be different and fan speed will be proportional to temperature in each range; and the control system operates with a minimum number of moving parts.

Further and more specific objects and advantages of the present invention are made apparent in the following specification wherein a preferred form of the invention is described by reference to the accompanying drawing.

In the drawing:

FIG. 1 is a semi-schematic illustration of a multiple heat exchanger including a fan which is operated through a drive system including the control system of the present invention;

FIG. 2 is an electrical schematic illustration of one of the preferred embodiments of the present invention; and FIG. 3 is an electrical schematic illustration of a second preferred embodiment of the present invention.

Referring now to FIG. 1, a multiple heat exchanger system 11 includes a first heat exchanger 12 having an inlet 13 and an outlet 14, a second heat exchanger 16 including an inlet 17 and an outlet 18, and a third heat exchanger 19 having an inlet 21 and an outlet 22. The temperature of the fluid passing out of the heat exchanger 12 is monitored by a detector 23 while a detector 24 and a detector 26 monitor the temperatures of the fluid in outlets 18 and 22 respectively. An electronic control unit 27 is electrically joined to the detectors 23, 24 and 26 through appropriate electrical conductors, and utilizes the information provided thereby to operate a hydraulic control valve 28 disposed in a fluid conduit 29.

The fluid conduit 29 communicates with a fluid operated device 31 which is mechanically disposed between a cooling fan 32 and the drive system 33 therefor. The drive system 33 is powered through a shaft 34 which connects to the vehicle engine (not shown). By controlling the device 31 the fan 32 is operated at any speed within its range. Thus, by operating the control valve 28 the electronic control 27 is effective to vary the speed of fan 32.

Referring now to FIG. 2 the detectors 23, 24 and 26 are most advantageously realized in the form of thermistors, the resistance of which varies inversely with temperature. Thermistors 23, 24 and 26 are electrically joined in series with fixed value resistors 36, 37 and 38 respectively. The three thermistor-resistor series combinations are joined in parallel across the vehicle battery 39 together with the series circuit of fixed resistor 41, variable resistor 42 having a slider 43, and fixed resistor 44.

The anode of a diode 46 is electrically joined between thermistor 23 and resistor 36; the anode of a diode 47 is electrically joined between thermistor 24 and resistor 37; and a third diode 48 has its anode electrically joined between thermistor 26 and resistor 38. Each of diodes 46, 47 and 48 has its cathode electrically joined to a common conductor 51, one end of which leads through a fixed value resistor 52 to the negative terminal of battery 39, while its other end is electrically joined to a conductor 53, which leads to a servo-amplifier 54. The slider 43 of variable resistor 42 is electrically joined to a conductor 56 which is electrically joined to a second conductor 57 which leads to servo-amplifier 54. The servo-amplifier 54 operates a torque motor 58 in response to a differential voltage between conductors 53 and 57 as will be explained more fully below. The torque motor 58 operates the control valve 28, which in addition to metering fluid, positions the slider 43 of variable resistor 42 through a mechanical connection shown diagrammatically by dotted line 59.

The operation of the invention is best described with reference to a concrete example. Thus, assume a battery voltage of 24 volts, resistance value of 500 ohms for each of resistors 36, 37 and 38, and a resistance value of 500 ohms for each of thermistors 23, 24 and 26 when they are at the bottom of their respective ranges. On the basis of these parameters, and assuming the three thermistors to be at the bottom of their ranges, the voltage at the thermistor-resistor junctions, and thus at the anodes of diodes 46, 47 and 48 is 12 volts. Assuming a maximum voltage drop across the diodes of .6 volt the voltage on conductor 51 is 11.4 volts D.C. The value of resistor 44 is selected such that when the slider 43 is at the bottom of its travel (at the junction between resistor 42 and resistor 44), the voltage on conductor 56 is 11.4 volts. Thus, when the thermistors are all at the bottom of their respective ranges, and the slider 43 at the bottom of its range, there is no voltage difference existing on conductors 53 and 57 and the control valve is positioned to produce no fan action (zero r.p.m.). The above condition is assured by having the mechanical correlation between control valve 28 and slider 43 such that the slider is only at the bottom of its range when the control valve 28 is closed.

If the temperature of thermistor 23 should rise 10°, its resistance will drop from 500 ohms to 400 ohms and the voltage at the junction between thermistor 23 and resistor 36 will rise to 13.3 volts. This places diode 46 1.3 volts higher than any of the other thermistor-resistor junctions whereby the diode passes current to conductor 51, and the voltage on conductor 51 increases to 12.7 volts (13.3 volts minus .6 volt drop across the diode). This rise in the voltage on conductor 51 results in a reverse-bias on the diodes 47 and 48 which virtually disconnects thermistors 24 and 26 from conductor 51. Thus, for all practical purposes the thermistor 23 is the only one in the circuit, and it alone controls the operation of the control valve, and through the control valve the fan 32.

The increase in voltage on conductor 51 results in an increased voltage on conductor 53 giving rise to a differential voltage at the input of the servo-amplifier 54, resulting in operation of torque motor 58 and control valve 28. Since the voltage differential of the input of the servo-amplifier 54 is due to a rise in temperature, the voltage on conductor 53 is greater than that on conductor 57, and the torque motor is operated in a direction which increases the flow of fluid in conduit 29 for the purpose of increasing the speed of fluid device 31 and hence fan rotation. When the control valve 28 is operated to meter more fluid, the slider 43 is urged toward the top of its range increasing the voltage on conductor 56. When the voltage on conductor 56 equals that on conductor 51, the voltage differential to the input of servo-amplifier 54 is zero, and the system is in a quiescent state.

If at this point, the fluid being monitored by thermistor 24 should rise 20°, the resistance of thermistor 24 would drop to 320 ohms whereby the voltage at the junction between thermistor 24 and resistor 37 would rise to 14.4 volts. When this occurs, diodes 46 and 48 become back-biased and the control of the fan is transferred to thermistor 24 exclusively since it is the highest within its temperature range. In addition, the bridge circuit is again unbalanced and urged to balance itself by increasing the flow of fluid in conductor 29 so as to increase the speed of fan blades 32, and at the same time, readjust slider 43 so as to establish a zero voltage differential at the input of servo-amplifier 54.

Should the fluid being monitored by thermistor 26 suddenly rise 50° to the top of the temperature scale of thermistor 26, the resistance of thermistor 26 will drop to 200 ohms and cause the voltage at the junction between thermistor 26 and resistor 38 to rise to 17.6 volts. Being the highest sensing device in its range, the other thermistors will be effectively removed from the circuit due to the back-biasing of their associated diodes, and the fan will come under the exclusive control of thermistor 26. If the resistor 41 is selected to establish a voltage of 17 volts on conductor 56 when the slider 43 is at the top of its range, then the occurrence of a voltage of 17.6 volts at the junction between thermistor 26 and resistor 38 will result in maximum speed operation of the fan since the control valve 28 is associated with slider 43 such that when the slider is at the top of its range the control valve is in its maximum open position, and the device 31 is fully engaged to produce the maximum fan speed.

If the fluid having the highest temperature within its range should decrease in temperature, the resulting voltage differential at the input of servo-amplifier 54 would be characterized by a higher voltage on conductor 57 than on conductor 53, which would result in operation of a torque motor 58 to produce adjustment of control valve 28 to reduce the flow of fluid in conduit 29 and, at the same time, urge the slider 43 toward the bottom of its range so as to lower the voltage on conductor 57 to match that on conductor 53. Thus, the result of a decrease in temperature is a decrease in fan speed with an accompanying saving of engine power.

In the event it should be desired to monitor an additional fluid temperature associated with heat exchanger 11 for controlling the fan 32, it is only necessary to add a thermistor 61, a resistor 62 and a diode 63. The circuit is affected only to the extent that the thermistor 61 will control the operation of the fan when the fluid with which it is associated is closer to its critical range than any of the other fluids being monitored. In a like manner, it is possible to eliminate certain fluids from controlling the fan by simply disconnecting the thermistors associated therewith from the circuit. In doing so the remaining thermistors are unaffected and able to continue to operate as before.

FIG. 3 illustrates a modified circuit which has several advantages in that it functions without the torque motor 58 and the series circuit of resistors 41, 42 and 44. The conductor 53' operates an electro-hydraulic valve 66 through amplifier 54' by energizing the coil 67 thereof.

The coil 67 leads to ground through a Zener diode 68, wherein the Zener diode is selected to produce a voltage drop equal to the voltage on conductor 53′ when all of the thermistors are at the bottom of their range (using the parameters given above, this would be 12 volts). By selecting a coil 67 having a range of 5 volts (representing the voltage swing between the bottom and top of the range of a given thermistor), the results achieved with the embodiment of FIG. 2 are achieved with this embodiment without a torque motor or null-seeking circuit. In all other respects the circuit functions in the same manner as that of FIG. 2.

We claim:

1. In combination with a variable speed fan associated with a plurality of heat exchangers whose cooling air requirements may vary independently of one another, an electronic discriminating control system comprising:

separate thermistors associated with each heat exchanger;

electronic switching means forming a circuit with all said separate thermistors, said circuit discriminating between said separate thermistors to select the one which registers the highest temperature abnormality in its associated heat exchanger and providing an electrical output representing said abnormal temperature condition; and electrically responsive control means connected to said electrical output and operable to vary the speed of said fan in response to said electrical output.

2. The electronic discriminating control system defined in claim 1 wherein said electronic switching means includes a separate resistor joined in series with each of said thermistors and separate diodes connected at each junction of each thermistor and its associated series connected resistor, each of said diodes having their opposite end connected to a common output.

3. An electronic discriminating control system as defined in claim 1 wherein the output of the electronic switching means is proportional to the temperature abnormality sensed by the thermistor and the control means adjusts the fan speed proportionally to said electrical output.

4. An electronic discriminating control system as defined in claim 1 wherein the switching means includes a D.C. power source and an adjustable voltage divider network with each series connected thermistor and associated resistor connected in parallel with said network.

5. An electronic discriminating control system as defined in claim 4 wherein the adjustable voltage divider network is mechanically linked to the control means for feedback so fan speed will be proportional to the degree of temperature abnormality sensed by the controlling thermistor.

References Cited

UNITED STATES PATENTS

| | | | |
|---|---|---|---|
| 1,912,154 | 5/1933 | Morrison | 236—35 |
| 2,396,000 | 3/1946 | Findley | 236—35 |
| 2,452,007 | 10/1948 | Weybrew | 236—35 |
| 2,505,597 | 4/1950 | Weiser | 236—35 |
| 2,756,026 | 7/1956 | Myrent. | |

EDWARD J. MICHAEL, *Primary Examiner.*